UNITED STATES PATENT OFFICE.

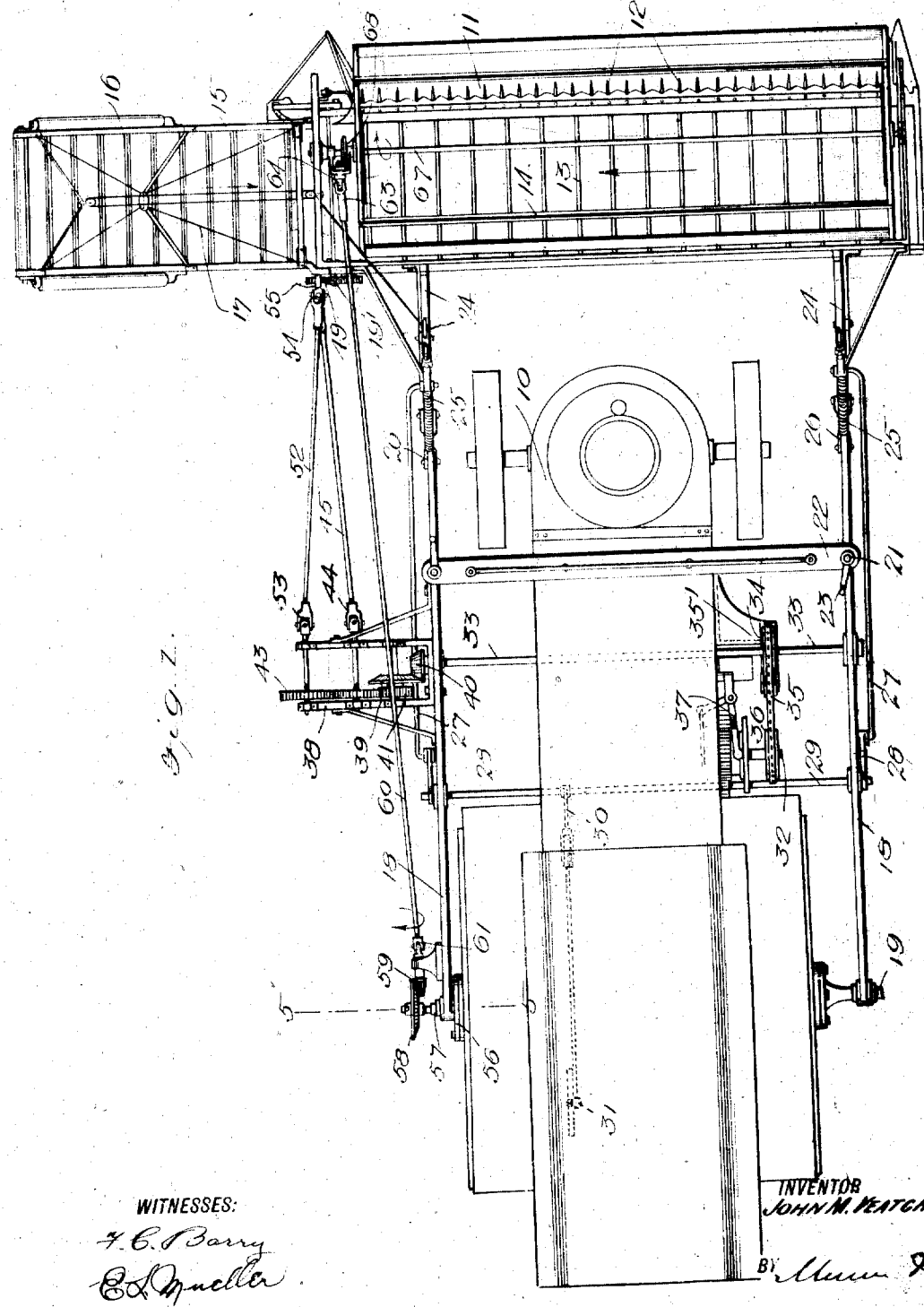

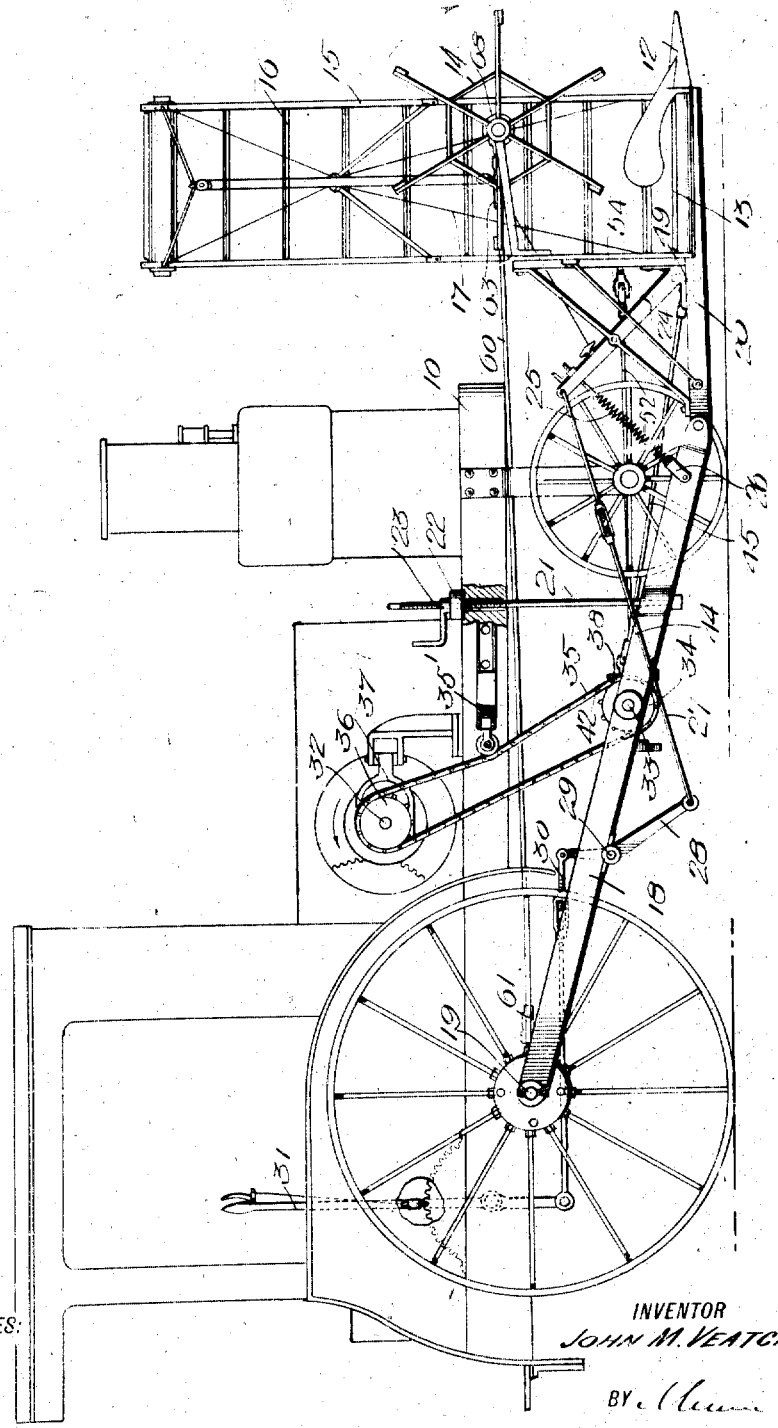

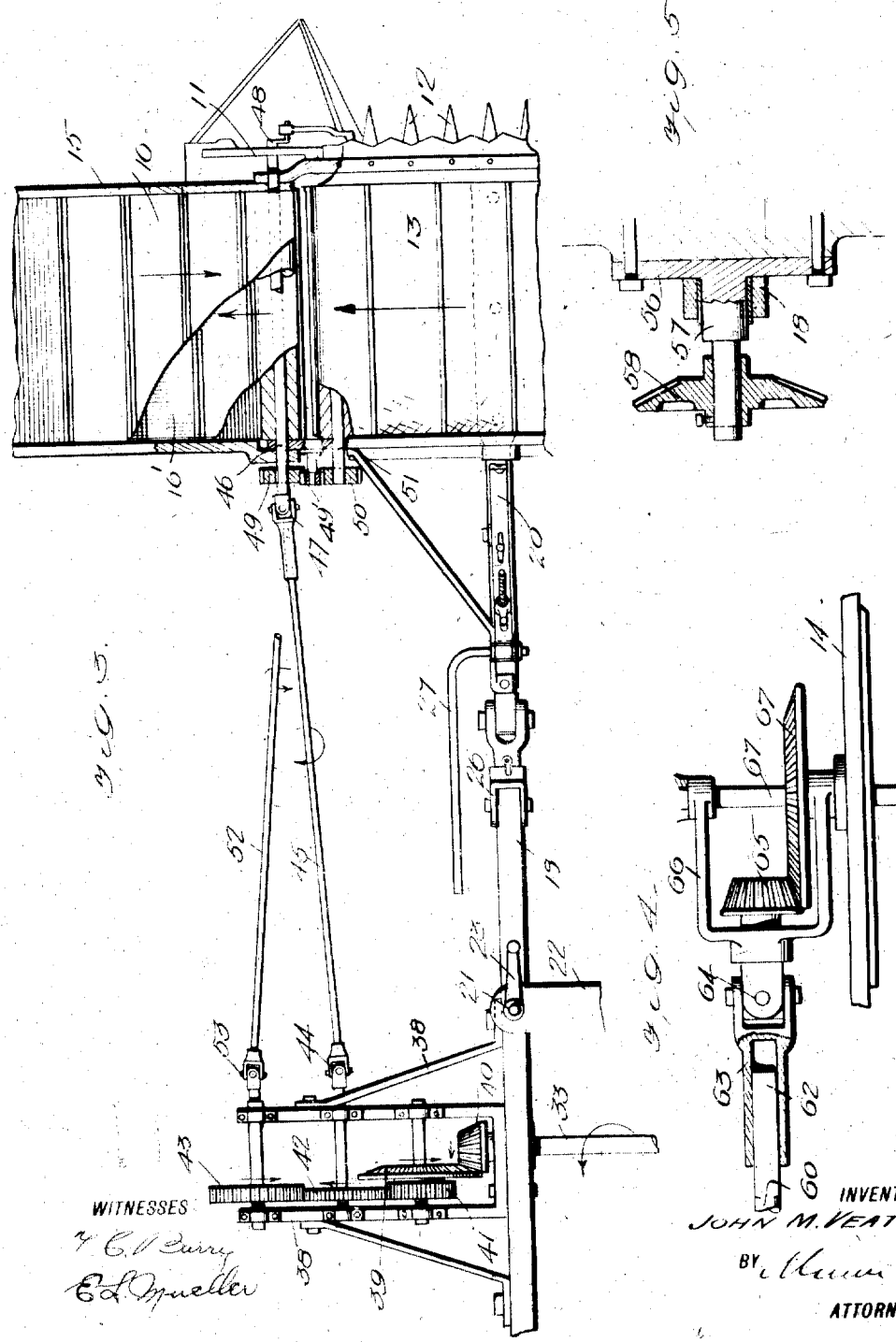

JOHN M. VEATCH, OF PALCO, KANSAS.

HARVESTING-MACHINE.

1,214,242. Specification of Letters Patent. Patented Jan. 30, 1917.

Application filed June 13, 1916. Serial No. 103,458.

*To all whom it may concern:*

Be it known that I, JOHN M. VEATCH, a citizen of the United States, and a resident of Palco, in the county of Ellis and State of Kansas, have invented an Improvement in Harvesting-Machines, of which the following is a specification.

This invention is an improvement in agricultural machines, and has particular reference to header attachments for tractors.

An object of the invention is the provision of novel means for adjusting the header, and cutter bars carried thereby, to the desired position when harvesting wheat, and the like, of different heights and when passing over uneven ground and, to this end, the invention includes a frame pivotally connected to some convenient part of the tractor and to the header, said frame supporting means for driving the several parts used in connection with said header and being vertically adjustable whereby the cutter bars and platform of the header may be raised and lowered.

The inventive idea involved is capable of receiving a variety of mechanical expressions, one of which, for the purpose of illustrating the invention, is shown in the accompanying drawings, in which—

Figure 1 is a top plan view of a tractor having a header attachment, the invention being shown in connection therewith. Fig. 2 is a side elevation. Fig. 3 is an enlarged fragmentary top plan view of the mechanism for driving certain parts of the header attachment. Fig. 4 is a similar view of a portion of the mechanism for driving another part of the header attachment. Fig. 5 is a section on the line 5—5 of Fig. 1.

Referring more particularly to the accompanying drawings, the numeral 10 indicates a tractor machine of any preferred construction with which is associated a header attachment of common construction including a platform 11, the usual reciprocating cutter bar 12, conveyer 13 and rotating reel 14, and to one end of the platform 11 the same has pivoted the usual inclined elevator 15 provided with upper and lower conveyers 16 and 16′ and means 17 for raising and lowering said elevator.

The means for supporting and adjusting the header attachment comprise the essential features of the invention and there is shown in the accompanying drawings what is now believed to be a preferred form thereof, in which a frame is employed consisting of side beams 18 pivoted to some portion of the tractor 10 and preferably the rear axle thereof as indicated at 19. The side beams 18 are similar in construction and are arranged alongside of the tractor with the beam 18 farthest from the elevator 15 at a greater distance from the side of the tractor than the beam 18 nearest said elevator in order that the weight of the elevator on that side of the machine, which would have a tendency to overbalance the same, will be compensated for.

The side beams 18 normally extend in a downwardly inclined direction and at their lowermost ends each has pivoted thereto the rear end of a platform supporting member 20 the forward end of which is secured to the platform 11 in any preferred manner. Means are provided in connection with the beams 18 for initially elevating the members 20 and consist of a vertically adjustable element 21 in the form of a rod associated with each of the beams 18 and having its lower end secured thereto. The upper end of the rod is screw-threaded and projects through the adjacent end of an arm 22 mounted upon and extending transversely of the platform of the tractor. Each rod has mounted upon its upper end a rotatable handle 23 which, when operated, raises the rod 21 so that the forward end of the beam 18 and the members 20 are elevated.

It may become desirable to elevate or lower the forward ends of the supporting members 20 and consequently the cutter bars 12 and to this end each of said supporting members carries a rearwardly and upwardly inclined arm 24 having one end of a coil spring 25 connected thereto adjacent its upper end, the other end of said spring being secured to a yoke 26 pivoted to the adjacent beam 18 contiguous to the forward end thereof, said spring normally having a tendency to draw the upper end of the arm 24 downwardly and thus raise the forward end of the supporting member 20. The upper end of each arm 24 has connected thereto one end of an adjustable rod 27 the other end of which is secured to one end of a bell crank lever 28 pivoted at 29 to the beam 18, the other arm of said lever having one end of an adjustable rod 30 pivoted thereto, the other end of said rod 30 being connected to an operating lever 31 operable from the cab of the tractor. Through this construction it will be seen that when the lever 31 is shifted forwardly the parts just described will be operated to raise the upper ends of the arms 24 and thus swing the members 20 about their pivots whereupon the forward end of the platform 11 and the cutter bars 12 will be lowered to the desired position.

The means, operated by the source of power 32 of the tractor, for driving the different parts associated with the platform 11 and elevator 15 are preferably supported by the side beams 18 and consist of a main driving shaft 33, journaled in said side beams intermediate the ends thereof and having mounted thereon a gear wheel 34 which is rotated by a chain 35 passing over a similar gear 36 operated by said source of power 32. A tension device 35' of any preferred construction is associated with the chain 35 whereby to take up the slack therein when the side beams 18 are elevated. A clutch construction 37 is associated with the means for operating the shaft 33 whereby the actuation thereof is controlled. A substantially U-shaped frame 38 projects laterally from the side beam 18 adjacent the elevator 15 and has supported therein a bevel gear 39 with which meshes a pinion 40 carried by the adjacent end of the shaft 33. Mounted upon the same stub shaft with the gear 39 is a gear wheel 41 meshing with a gear 42 which in turn drives another gear 43. The gear 42 is connected, through a universal or knuckle joint 44 with one end of a cutter bar operating shaft 45 the other end of which is attached to a shaft 46 by a universal or knuckle joint 47, the forward end of the shaft 46 having a crank 48 for reciprocating cutter bars 11. The lower elevator conveyer 16' is also driven over the shaft 46. The rear end of the shaft 46 is provided with a gear 49 meshing with a pinion 49' which drives a gear 50 carried by the rear end of a shaft 51 over which passes the conveyer 13, the same being operated by the rotation of said shaft 51. If desired, a chain or belt drive may be employed instead of the gearing 49, 49' and 50.

The upper conveyer 16 of the elevator 15 is operated in a manner similar to that just described and for this purpose there is provided a shaft 52 having at its rear end a universal joint 53 connected to the outer shaft on which is mounted the gear 43. The forward end of shaft 52 is also provided with a universal joint 54 connected to the rear end of the shaft 55 arranged in parallel relation to the shaft 51 and having mounted thereon the said conveyer 16.

The invention also embodies means for operating the reel 14 and by referring to Fig. 5 it will be seen that said means includes a plate 56 having a stub shaft 57 extending therefrom in a line with the rear axle of the tractor, the rear ends of beams 18 being also mounted on said stub shaft. A bevel gear 58 is mounted upon the stub shaft 57 and meshes with a pinion 59 connected to the rear end of a shaft 60 by means of a universal joint 61. Preferably, the forward end of the shaft 60 is squared, as indicated at 62, in Fig. 4, and mounted in a coupling 63 forming a part of a universal joint 64 which carries a pinion 65 mounted in a yoke 66 supported on the shaft 67 of the reel 14, said pinion 65 driving a bevel gear 68 whereby said reel is rotated. The forward ends of the shafts 45 and 52 are also preferably squared to provide an adjustable joint to permit of the adjustment of the head attachment.

What is claimed is:

1. In a harvesting machine, the combination of a tractor, a header attachment including a platform and platform supporting means, a frame including side members pivoted at their rear ends to said tractor, and pivotally connected at their forward ends with said platform supporting means, vertically adjustable elements carried by said tractor and engaging said side members intermediate their ends for raising and lowering the same to raise or lower said header attachment, upwardly and rearwardly extending arms carried by said platform supporting means, spring connections between said arms and the side members of said frame, and means carried by the tractor and having a pivotal connection with said side members and secured to said arms for adjusting the same to raise and lower the said header attachment including the cutter bar thereof.

2. In a harvesting machine, the combination of a tractor, a header attachment, platform supporting members for the header attachment, a frame having side members pivoted to said tractor and pivotally connected with said supporting members for supporting the latter and said header attachment, vertically adjustable elements carried by said tractor and engaging said frame for raising and lowering said supporting members and the header attachment, arms extending from said platform supporting members, resilient means connecting said arms and said side members of the frame and normally tending to raise the forward ends of the supporting members and the header attachment and means having a connection with said frame and secured to said arms for adjusting the latter against the tension of said resilient means to lower the forward portion of said supporting members and the header attachment including the cutter bar thereof.

3. In a harvesting machine, the combination of a tractor, a header attachment including a platform, an elevator, a conveyer associated with each, a cutter bar mounted above said platform, and a reel also associated with said platform, the header attachment also including rearwardly extending platform supporting members, members pivotally connected to said tractor and pivotally connected at their forward ends with the platform supporting members for supporting said header attachment, the said pivoted members being adjustable to raise and lower the header attachment, means for raising and lowering the header attachment independently of the movement of the said pivoted members, a U-shaped frame extending laterally from one of said pivoted members, a train of gears mounted in said frame, shafts having their rear ends supported in said frame and connected to said gears for operating the conveyers and cutter bar, a main driving shaft journaled in said pivoted members and operated by the motive power of said tractor for driving said shafts, and another shaft connected to one of the axles of the tractor and to the reel for rotating the latter.

4. In a harvesting machine, the combination of a tractor, a header attachment, side beams pivoted to said tractor, platform supporting means secured to said header attachment, and pivoted to said side beams, means for adjusting said side beams to actuate said platform supporting means to raise or lower said header attachment, and means for raising and lowering the platform supporting means and the header attachment independent of the movement of said side beams, the said means including bell-crank levers pivoted on the side beams, rods connecting one end of the bell-crank levers with members of the platform supporting means, and an operating lever connected with the other ends of said bell crank levers.

5. In a harvesting machine, the combination of a tractor, a header attachment, side beams pivoted to said tractor, and pivotally connected at their forward ends with said attachment, means carried by said tractor for adjusting said side beams to raise or lower the said attachment, bell-crank levers pivoted on the side beams, an operating lever connected with the bell-crank levers, means connecting the bell-crank levers with the header attachment, to independently adjust the latter, and means operated by the motive power of the tractor, for driving the parts of the header.

JOHN M. VEATCH.

Witnesses:
  J. W. Chas. Williams,
  E. G. Inlon.